United States Patent [19]

Göring et al.

[11] 4,321,683
[45] Mar. 23, 1982

[54] MEASURING SYSTEM FOR ALIGNMENT AND MEASUREMENT WITH AN ELECTRONIC TACHYMETER

[75] Inventors: Hermann Göring, Jena; Peter Hentschel; Wolfgang Meyl, both of Dresden, all of German Democratic Rep.

[73] Assignee: Jenoptik Jena G.m.b.H., Jena, German Democratic Rep.

[21] Appl. No.: 69,944

[22] Filed: Aug. 27, 1979

[30] Foreign Application Priority Data

May 25, 1978 [DD] German Democratic Rep. ... 205575

[51] Int. Cl.³ .............................................. G01C 3/08
[52] U.S. Cl. ......................................... 364/561; 356/5
[58] Field of Search ..................... 364/561, 562; 356/5, 356/4, 141, 152

[56] References Cited

U.S. PATENT DOCUMENTS

| | | | |
|---|---|---|---|
| 3,742,473 | 6/1973 | Hadden | 340/870.19 X |
| 3,992,615 | 11/1976 | Bennett et al. | 364/561 |
| 4,018,986 | 4/1977 | Wilk | 340/870.19 X |
| 4,090,176 | 5/1978 | Rodler | 340/870.19 X |
| 4,113,381 | 9/1978 | Epstein | 364/561 X |
| 4,115,552 | 9/1978 | Bodlau | 364/561 X |
| 4,119,948 | 10/1978 | Ward et al. | 340/870.19 X |
| 4,144,574 | 3/1979 | Chamuel | 364/561 |
| 4,188,618 | 2/1980 | Weisbart | 340/870.19 X |

*Primary Examiner*—Edward J. Wise
*Attorney, Agent, or Firm*—Jordan and Hamburg

[57] ABSTRACT

A measuring system includes a tachymeter station and a reflector or evaluating station. The tachymeter station is provided with an electronic tachymeter, along with a calculating or computing device and a portable radio transmitter, for transmitting data processed by the calculator in accordance with measurement data from the tachymeter. The transmission of information is in the form of pulse width modulation. The reflector or evaluating station includes a radio receiver having a pulse demodulator, and a display unit for displaying coordinate positions in accordance with received data.

4 Claims, 5 Drawing Figures

MEASURING SYSTEM FOR ALIGNMENT AND MEASUREMENT WITH AN ELECTRONIC TACHYMETER

BACKGROUND OF THE INVENTION

The invention relates to a measurement system for alignment and measurement of positions with an electronic tachymeter. The application of the invention is particularly adaptable, when an electronic tachymeter and a reflector are used according to the polar method for the transfer of layout-points into the terrain, or for the reproduction of points in a trigonometric triangulation. When aligning by this method, the station of the reflector may be brought successively closer to the point to be aligned, based upon transmitted components of changed positions. Furthermore, the application of the invention is used when numerical information must be transmitted via a radio channel from a central location to a receiver and must be represented visually at the receiver. This is applicable to dispatching systems where numerical information must be transmitted by radio equipment with or without acoustical information transfer and where the information is stored by the receiver and recalled when needed.

When aligning points in the field of geodetic engineering, according to the Polar Method, points of a structure projected from reference points are transferred in locality by plotting angles, lengths and differences of height by means of geodetic instruments. In known processes using tachymeters, the visual axis of the tachymeter is placed in the vertical plane, given by the plumb line at the tachymeter location and by the direction towards the point to be aligned. The reflector is trained into this vertical plane and is positioned as close as possible to the point to be aligned or surveyed. The distance between the tachymeter station and the reflector station is measured. The difference between this distance and the designed distance between the station of the tachymeter and the point to be aligned is calculated, and this difference is plotted in the established vertical plane by directly measuring the distance between the position of the reflector and the point to be aligned. The reflector and the point to be aligned must be trained very exactly in the fixed vertical plane, based upon the tachymeter station. This procedure is very difficult and time-consuming for large distances. The measured distance is read at the tachymeter location, but the difference value is needed at the location of the reflector. When electronic tachymeters are used in known technical procedures, the measured values at the location of the tachymeter may be stored intermediately in a machine-readable data-logger. Thus, immediate transfer of this numerical information to an exploitation station has heretofore not been possible.

OBJECT OF THE INVENTION

It is therefore the object of this invention to provide means for the immediate transfer of the measuring results obtained from an electronic tachymeter, or numerical information derived therefrom, for subsequent treatment, to the reflector station or to a station which can use this information.

BRIEF SUMMARY OF THE INVENTION

Briefly stated, in accordance with the invention, a measuring arrangement for the alignment and measurement with electronic tachymeters is provided with means for the immediate transfer of numerical information to the reflector location or to another station which can use this information.

In accordance with the invention, measured values obtained from the tachymeter or values derived therefrom are transferred immediately to other stations. Thus it is particularly useful for the alignment process to be able to store and visually represent information referring to a required change of position at the reflector station so that it may be brought to the position of the point to be aligned in a well-directed manner. When such information is transferred acoustically, unwanted reception by others as well as speech and hearing troubles cannot be excluded, so that a secure system is needed, avoiding severe physical and psychological stresses for personnel involved in the transfer of information, stresses much larger than required in use of the information transfer system according to the present invention.

Polar surveying is dependent upon the fixing, in an exterior reference system, of a reference point, a point to be surveyed and a position for the tachymeter by their coordinates. A calculator at the tachymeter position aids in calculating from these coordinates, as well as from the directional angles and the distances, measured between tachymeter position and reflector position by known formulae of the coordinates of the reflector position and subsequently the polar and/or orthogonal alignment elements $\alpha$, l, $\Delta x$ and $\Delta y$ for the point to be surveyed or aligned relative to an instantaneous local coordinate system x, y. This coordinate system x, y is set by using the reflector position as the origin of coordinates and one direction, beginning there and well-defined (for instance according to a fixed point lying in the external reference system, or by North). The alignment elements are used as components of change of location for the reflector position and are transferred thereto with the aid of the measurement arrangement, according to the invention, and visually displayed. Based upon that information, the reflector position may be varied iteratively in such a manner that its locus successively approaches, within the allowed tolerance, the position of the point to be aligned.

The measurement arrangement according to the invention includes an information analyzer according to the invention, and a known electronic calculator and transfer device, at the position of the electronic tachymeter. The measurement arrangement also includes, at the reflector position or at the evaluation station, a known receiver device, as well as an impulse integrator according to the invention.

The information analyzer and the impulse integrator may be pocket instruments for either mobile or fixed position use. The measurement arrangement allows the extraction of the measurement values obtained with an electronic tachymeter, or the values obtained thereof with the aid of the information analyzer time multiplexer and the processing of them in such a manner that they are transmitted to the receiver as pulse duration signals modulated by the transfer device via a transfer channel (e.g. radio channel). The impulses received by the receiver are processed by the impulse integrator, stored and are reproduced visually (e.g., as number) when needed.

A considerable improvement of the measurement arrangement is obtained by using a completely automatically functioning tachymeter having an integral microcomputer, data output unit and modulator. In this event an expensive information analyzer is superfluous.

BRIEF FIGURE DESCRIPTION

In order that the invention may be more clearly understood, it will now be disclosed in greater detail with reference to the accompanying drawings, wherein FIG. 1 shows a group of points for explaining a polar alignment procedure;

DETAILED DISCLOSURE OF THE INVENTION

Figure 1:
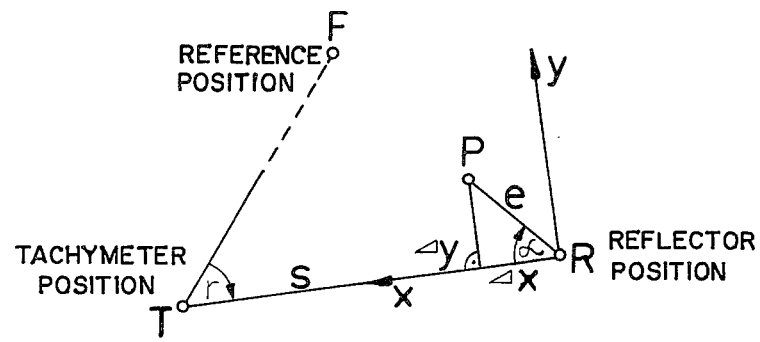

In the process of polar alignment an electronic tachymeter is provided in FIG. 1 at a tachymeter position T. The reflector position R is chosen close to the point P to be aligned. The tachymeter position T is the locus for measuring the directional angle between a preselected fixed point F and the reflector position R as well as the distance S to the reflector position R. These measured values which are preferably automatically fed to an electronic calculator (not shown) along with the coordinates (which must be prestored) of the fixed point F, the to be aligned point P and the tachymeter station T, serve to enable the calculation according to known formulae of the polar and/or the orthogonal locus change components $a$, $l$, and $\Delta x$, $\Delta y$ in an instantaneous local coordinate system. In that system, the reflector position is the source of the coordinates and the direction from it towards the tachymeter station denotes the positive abscissal axis. With the aid of the measuring arrangement according to the invention, the components of change of position of the reflector are transmitted to the reflector station and visually represented at such positions. Based upon this information, the position of the reflector station R relative to the position of the tachymeter station T is varied in such a manner that its locus approaches the locus of the point P to be aligned. Then the above steps of the process are repeated and iteratively repeated until the reflector station R has approached the locus of the point P to be aligned so closely that the components of locus change are within a predetermined allowed tolerance. The trigonometric height transfer may then be effected from the tachymeter station T to the reflector station R, and a statement of height as well as a point number (position mark) may be transferred and visually represented.

The measurement arrangement at the tachymeter station T may be comprised of a programmable electronic calculator with a memory for the coordinate field of the fixed points and the points to be aligned, an information analyzer (shown in FIG. 2) and a portable radio telephony device (transmitter). The reflector station R includes a signal integrator (shown in FIG. 3) and a radio receiver device (receiver). The coordinates of the fixed point F, the point P to be aligned and the tachymeter station T are fed manually to the calculator, and the measured values for the directional angle r and distance S are preferably fed thereto automatically. According to the program of recalculation, the polar and/or orthogonal components of locus change $a$, $l$ and $\Delta x$ and $\Delta y$ are derived from the displayed digital number with the aid of the information analyzer, and are fed with pulse duration modulation to the transfer device for transmission. Impulses arriving in the receiving device are processed with the aid of the impulse integrator, and visually displayed at the receiver.

Figure 2:
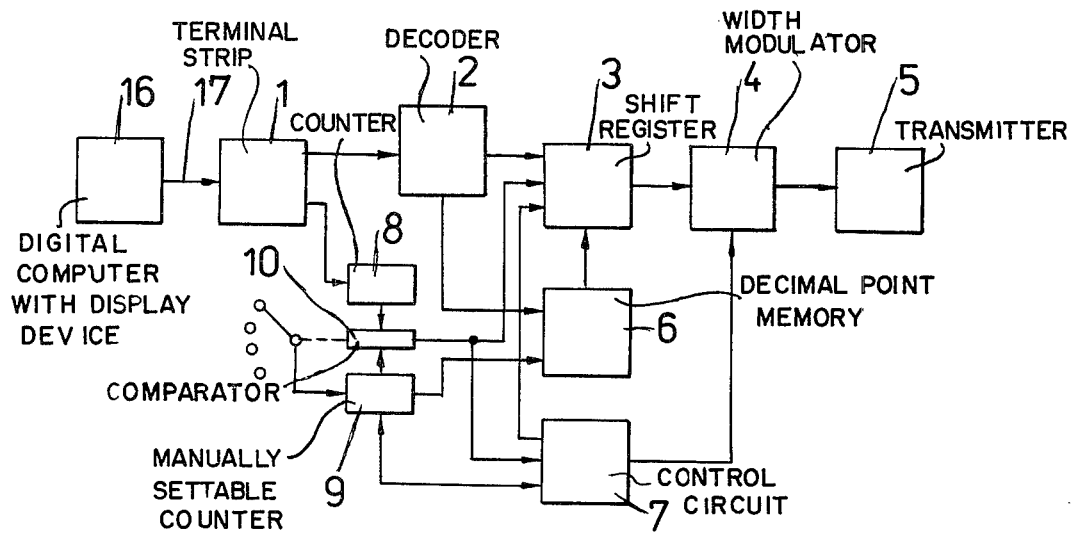
FIG. 2 is a block diagram of an information analyzer according to the invention.
Figure 3:
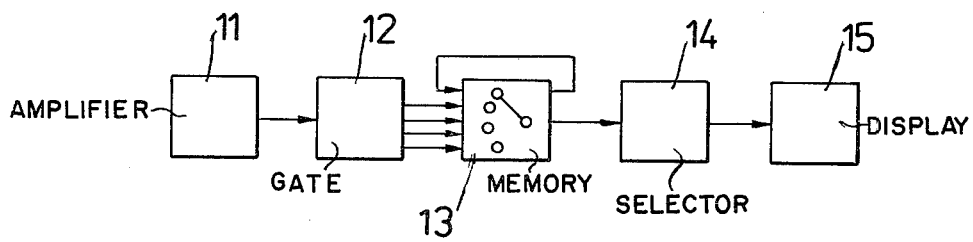
FIG. 3 is a block diagram of an impulse integrator according to the invention.

According to FIG. 2, the information analyzer is comprised of a terminal strip 1 connected to the terminals of a seven-segment display (not shown) of, for example, a digital computer 16, and the terminal strip also connects the digital computer to a decoder 2 and a counter 8 via a cable 17. The construction employed here is of course dependent upon the type of computer employed. The data accepted by the terminal strip 1 contains at the exit of the (not shown) segment drivers, transcribed numbers, commas and sign digits and a clock frequency obtained from the digital position derives. In other words, the information analyzer of FIG. 2 may derive its input data from the signals applied to the visual display of a calculator, or a digital computer.

The contents of counter 8, controlled at a clock frequency corresponding to the multiplexer frequency of the digital computer 16, are compared with a manually presetable counter 9 by means of a comparison circuit 10. When a comparison is obtained, the signal applied in parallel at that time to the input of a shaft register 3 from decoder 2, is accepted by the shift and serially transmitted to the transmitter device 5. The transmission occurs by use of pulse duration modulator 4, in which a logical state H corresponds to a long pulse and a logical state L corresponds to a short pulse. A control circuit 7 regulates the serial transmission of the modulation. After transmission of a signal, the counter 9 is set back on count by the control circuit 7. It is rechecked for comparison and the next signal is accepted. This process repeats itself until the counter 9 has reached the null position and thereby the previously transmitted number of signals has been accepted from the digital computer. The position of the decimal point is stored during the transmission in the decimal point memory 6. This occurs when the status of the counter 9 is transferred to the memory 6 at the time the decimal point driver of the digital computer is controlled (i.e. energized). The position of the decimal point is transmitted last and is co-encoded with the sign digit as a single data signal.

The information, arriving at the portable radio receiver (not shown) as pulse duration modulated signals, is amplified in an amplifier 11 within the pulse integrator (FIG. 3) and is demodulated by conventional means such as a gate circuit 12. The gate circuit 12 ensures the elimination of interference. After demodulation the information is fed into circulating memory 13. A definite part of the circulating memory 13 may be assigned to a seven-segment-indicator 15 by means of a selective switch. Numbered indication is handled by time-multiplexing.

Figure 4:
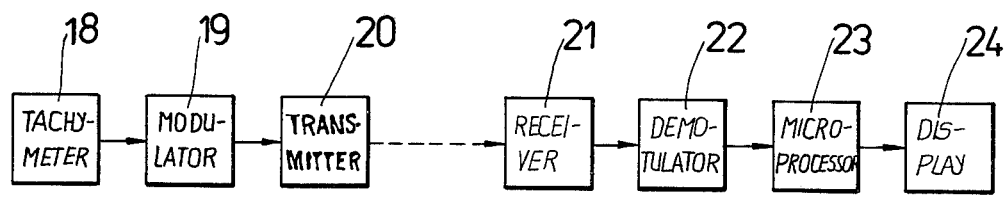
FIG. 4 is a block diagram of a measuring arrangement according to the invention, when using an automatic tachymeter.

In FIG. 4, 18 denotes an automatic tachymeter with an integral microcomputer and data output, 19 a modulator and 20 a transmission device (hand-held radio telephony transmitter). The tachymeter 18 applies the signals corresponding to the measuring results and the point identification to the modulator 19. The modulator modulates the signals and transfers them to the transmission device 20 and also controls the transmitter. At the reflector station a portable radio receiver 21 is connected to demodulator 22, which connects the high frequency information to low frequency information and processes it for a microcomputer 23. The microcomputer 23 uses the received low frequency information according to a fixed program, and controls a display device 23.

Figure 5:
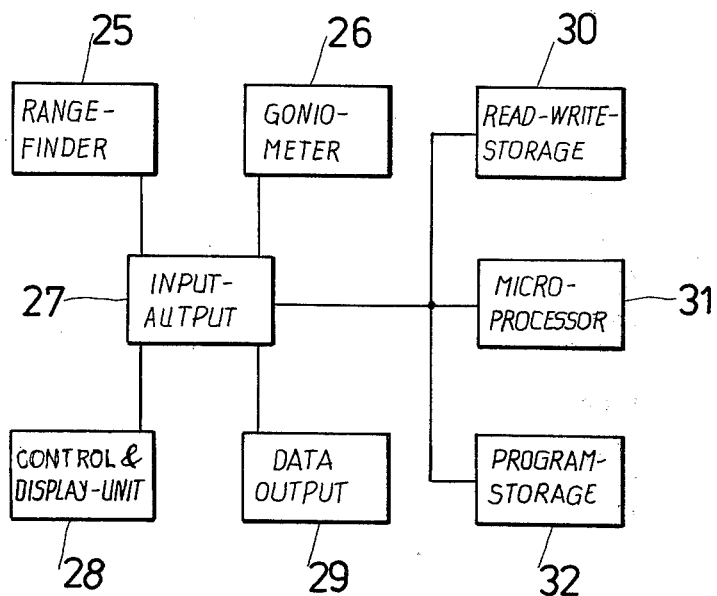
FIG. 5 is a block diagram of the automatic tachymeter.

The automatic tachymeter (18 in FIG. 4) includes, according to FIG. 5, a range finder 25, an angle measuring device such as goniometer 26 and an input-output unit 27, control and indicator unit 28, data output 29, read and write memory 30, microprocessor (central processing unit) 31 and program memory 32, all comprising parts of a microcomputer.

Data obtained by the automatic tachymeter by means of the integrally contained range finder 25 or the angle measuring device 26, respectively, are stored in the read-and-write memory 30 by means of the input-output unit 27 and are, with the aid of the microprocessor 31 according to a program, fixed in the program memory 32. They are combined with data contained also in the read-and-write memory 30, fed in prior to or after the measurement through the input-and-output unit 27, as well as the control and display unit 27. All the aforesaid data and results are transferred to the data output 29 by use of the input-output unit 27 according to an output program also stored in the program memory 32. The output program may, for instance, be a pulse duration modulator. The data output 29 controls a modulator (19 in FIG. 4) which controls the transmission device (20 in FIG. 4).

While the invention has been disclosed and described with reference to a single embodiment, it will be apparent that variations may be made therein, and it is intended in the following claims to cover each such variation and modification as falls within the true spirit and scope of the invention.

What is claimed is:

1. In a measuring system for alignment and measuring including a tachymeter station having an electronic tachymeter comprising a calculating means and data transmitting means at the tachymeter station and a receiving device and a pulse integrator at a second station, said tachymeter station further including an information analyzer for analyzing measuring data from said electronic tachymeter, said information analyzer comprising a decoder, a counter, terminal strip means connected to apply input data to said decoder and counter, a shift register connected to receive signals from said decoder, pulse width modulating means connected to pulse width modulate the output of said shift register, said data transmitting means being connected to transmit signals from said modulator, the measuring system further comprising a second presettable counter, comparison means connected to provide an output signal in response to the comparison of data in said first-mentioned and preset counters, and means for controlling said shift register with the output of said comparator.

2. The measuring system of claim 1 wherein said information analyzer further comprises a decimal point memory connected to control the transmission of decimal points.

3. The measuring system of claim 2 wherein said calculating means has a seven-segment multiplexed display, wherein said terminal strip is connected to receive signals applied to said display, and further comprising means for controlling said first-mentioned counter at the multiplex rate of said display.

4. In a measuring system for alignment and measuring including a tachymeter station having an electronic tachymeter comprising a calculating means and data transmitting means at the tachymeter station and a receiving device and a pulse integrator at the second station, said pulse integrator comprising an input amplifier, a gate circuit connected to said input amplifier for demodulating signals received thereby, a circulating memory connected to receive signals from said gate circuit, a display device, and selective switch means coupled to selectively apply signals from said circulating memory to said display device.

* * * * *